Patented Oct. 24, 1950

2,527,300

UNITED STATES PATENT OFFICE 2,527,300

COPOLYMERS OF UNSATURATED SULFONIC ACIDS AND POLYUNSATURATED COMPOUNDS

James R. Dudley, Darien, Conn., assignor to American Cyanamid Company, New York, N. Y., a corporation of Maine No Drawing. Application March 18, 1948, Serial No. 15,726

3 Claims. (Cl. 210—24)

This invention relates to cation exchange materials, a method of manufacturing cation exchange materials, and the use of cation exchange materials for the removal of cations from, or the exchange of cations in, liquid media. More particularly, the invention relates to new granular, water-insoluble, synthetic cation exchange resins active for the removal of cations from solution.

It is an object of the present invention to provide a new synthetic cation exchange resin active for the removal of cations from solution.

It is another object of the present invention to provide a process for the preparation of new synthetic cation exchange resins active for the removal of cations from solution.

A further object of the present invention is a process for the purification of liquids by means of new granular, water-insoluble, synthetic cation exchange resins active for the removal of cations from solution.

The above and other objects are attained by the preparation of a copolymer of a polymerizable organic sulfonic acid containing at least one $CH_2=C<$ group, or a substance hydrolyzable thereto, and a polymerizable poly-unsaturated organic material, and application of said copolymer in granular form to the purification of liquids and more particularly, of aqueous solutions.

In the past, ethylenesulfonic acid has been polymerized alone, and it has been copolymerized with other substances such as methyl alpha-chloroacrylate, chloroprene, and the like. The resulting products are linear polymers which are not useful as cation exchange resins because of their high water solubility.

The invention will be described in greater detail in conjunction with the following specific examples in which proportions are given in parts by weight. The examples are merely illustrative, and it is not intended that the scope of the invention be restricted to the details therein set forth.

Example 1

14.5 parts of ethylenesulfonic acid (0.13 mol.)
14.5 parts of N,N'-methylenediacrylamide (0.09 mol.)
29 parts of water
0.2 part of potassium persulfate in 5 parts of water The N,N'-methylenediacrylamide is dissolved in the ethylenesulfonic acid by heating to 110° C. with agitation. The solution is then cooled to 40° C. and the water is added. The potassium persulfate solution is added to the diluted, cooled ethylenesulfonic acid solution, whereupon practically instantaneous formation of an opaque gel is accompanied by a temperature rise to 70°–80° C. The gel is broken up, allowed to dry at 30° C. for three days, and then dried for four hours at 100° C.

The resin obtained is activated with hydrochloric acid and then exhausted to sodium bicarbonate solution. It has a density of 20.8 lbs. per cubic foot, and a capacity for the removal of cations from solution equivalent to 3.5 kilograins of $CaCO_3$ per cubic foot of resin.

Example 2

12 parts of ethylenesulfonic acid (0.11 mol.)
6 parts of N,N'-methylenediacrylamide (0.04 mol.)
10 parts of sodium hydroxide in 10 parts of water
10 parts of dioxane (commercial product containing peroxides)

The N,N'-methylenediacrylamide is dissolved in the ethylenesulfonic acid by heating, and the sodium hydroxide solution is added. While maintaining the temperature sufficiently high to keep the solid material dissolved, the dioxane is added. The gel which forms almost immediately is dried for 20 hours at 90° C., and upon activation and exhaustion as described in Example 1, the resin is found to have a density of 8.3 lbs. per cubic foot and a capacity for the removal of cations from solution equivalent to 10.1 kilograins of $CaCO_3$ per cubic foot of resin.

Example 3

24 parts of ethylenesulfonic acid (0.22 mol.)
6 parts of N,N'-methylenediacrylamide (0.04 mol.)
17.2 parts of sodium hydroxide in 17.2 parts of water
20 parts of water
6 parts of dioxane (commercial product containing peroxides)

The N,N'-methylenediacrylamide is dissolved in the ethylenesulfonic acid. The sodium hydroxide solution is diluted with the water, and the diluted solution is added slowly, with agitation, to the ethylenesulfonic acid solution. The dioxane is added with agitation to the resulting solution which has a pH of about 8. Gelation occurs in about 2 seconds, the gel is placed in an oven at 95° C. for ½ hour to complete polymerization, and the product obtained is then broken up and dried for 16 hours at 95° C.

Upon evaluation as in Example 1, the resin is found to have a density of 4.8 lbs. per cubic foot and a capacity for the removal of cations from solution equivalent to 8.0 kilograins of $CaCO_3$ per cubic foot of resin.

The N,N'-methylenediacrylamide used in the preceding examples may be prepared in accordance with the disclosure of the copending application of Lennart A. Lundberg, Serial No. 707,040 filed October 31, 1946, now Patent No. 2,475,846 dated July 12, 1949, as follows:

199 parts of acrylamide (2.8 mols.)
113 parts of formaldehyde (1.4 mols.)
2 parts of cupric acetate
150 parts of water
47 parts of concentrated hydrochloric acid (37%)

To a well agitated mixture of the acrylamide, formaldehyde, cupric acetate and water is added the hydrochloric acid. An exothermic reaction occurs, and after it has subsided the mixture is heated for ½ hour. A white crystalline solid separates on cooling and is recovered by filtration. This material, which represents a 50% yield of N,N'-methylenediacrylamide based on the theoretical, is recrystallized from ethanol. The pure product is found to have a melting point of 185°–186° C. and the following analysis:

|  | Calculated for $C_7H_{10}O_2N_2$ | Found |
|---|---|---|
|  | Per cent | Per cent |
| Carbon | 54.53 | 54.61 |
|  |  | 54.48 |
| Hydrogen | 6.53 | 6.34 |
|  |  | 6.42 |
| Nitrogen | 18.18 | 18.09 |
|  |  | 18.15 |

The present invention is in no sense limited to the use of ethylenesulfonic acid as one of the principal resin-forming ingredients. Any organic sulfonic acid which contains a $CH_2=C<$ group may be used. Also suitable are substances which are so related to such organic sulfonic acids as to be hydrolyzable thereto, i. e., the salts, esters, anhydrides, amides, etc., of the sulfonic acids.

The unsaturated sulfonic acids used in the present invention may be aromatic or aliphatic. Suitable aromatic acids include those of the general formula

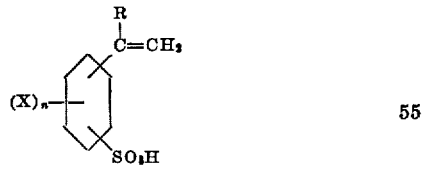

wherein R is hydrogen, methyl, or a halogen, X is an alkyl group containing from 1 to 8 carbon atoms, a halogen atom, or a hydroxyl group, and $n$ is zero or a whole number from 1 to 3. For example, I may use:

o-, m-, or p-styrene sulfonic acids

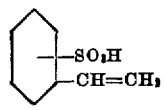

o-, m-, or p-isopropenylbenzene sulfonic acids

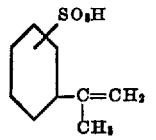

o-, m-, or p-alpha-chlorostyrene sulfonic acids

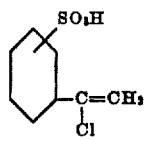

o-, m-, or p-alpha-bromostyrene sulfonic acids

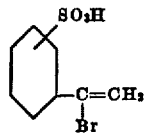

2-vinyl-3-chlorobenzenesulfonic acid

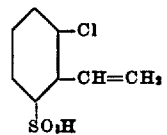

2-vinyl-4-bromobenzenesulfonic acid

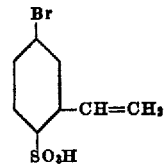

2-vinyl-5-fluorobenzenesulfonic acid

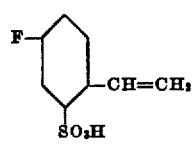

2-vinyl-6-chlorobenzenesulfonic acid

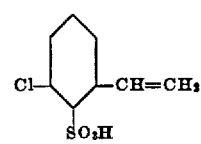

2-bromo-3-vinylbenzenesulfonic acid

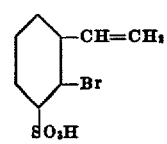

3-vinyl-4-chlorobenzenesulfonic acid

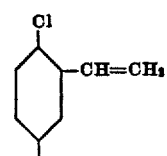

3-vinyl-5-bromobenzenesulfonic acid

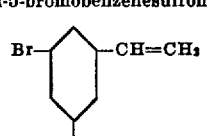

3-chloro-4-vinylbenzenesulfonic acid

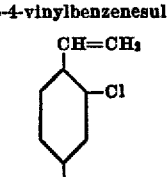

2-fluoro-4-vinylbenzenesulfonic acid

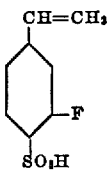

2-isopropenyl-3-chlorobenzenesulfonic acid

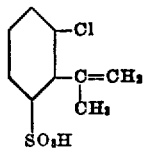

2-bromo-3-isopropenylbenzenesulfonic acid

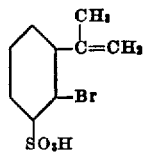

3-chloro-4-isopropenylbenzenesulfonic acid

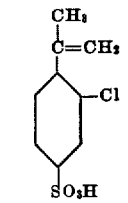

2-vinyl-3-methylbenzenesulfonic acid

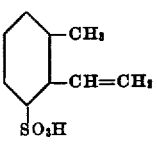

2-vinyl-4-ethylbenzenesulfonic acid

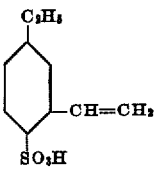

2-isopropenyl-6-isopropylbenzenesulfonic acid

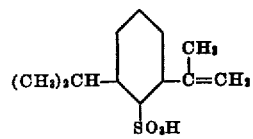

2-n-amyl-3-vinylbenzenesulfonic acid

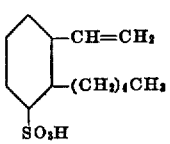

3-isopropenyl-4-methylbenzenesulfonic acid

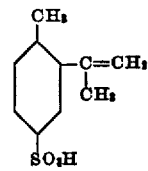

3-isopropenyl-5-n-octylbenzenesulfonic acid

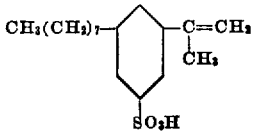

3-ethyl-4-vinylbenzenesulfonic acid

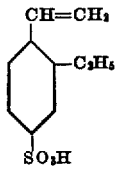

3-vinyl-4-hydroxybenzenesulfonic acid

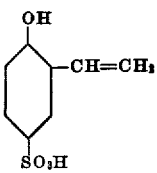

2-methyl-3-vinyl-5-hydroxybenzenesulfonic acid

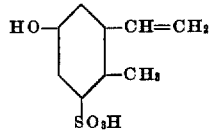

3-chloro-4-vinyl-5-hydroxybenzenesulfonic acid

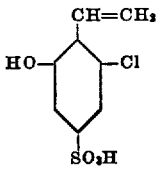

2-vinyl-3,6-dichlorobenzenesulfonic acid

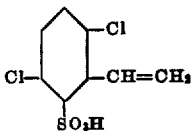

2-vinyl-3,5-dihydroxybenzenesulfonic acid

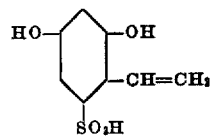

2-vinyl-3,4,5-trihydroxybenzenesulfonic acid

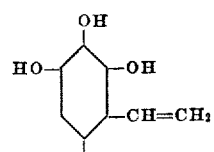

3-vinyl-4-methyl-5-chlorobenzenesulfonic acid

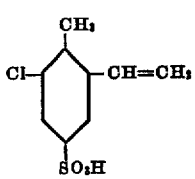

Corresponding naphthalene and other aromatic sulfonic acids may also be used as, for example:

1-hydroxy-4-sulfo-6-vinylnaphthalene

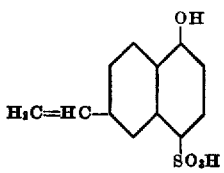

3-isopropenyl-1-naphthalenesulfonic acid

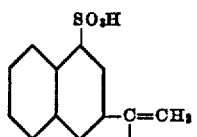

1-sulfo-3,6-dichloro-4-vinylnaphthalene

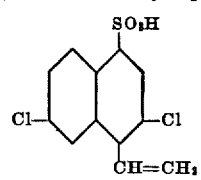

Also suitable for use in the preparation of my new copolymers are those unsaturated aromatic sulfonic acids in which the CH$_2$=C< group is attached not directly to a nuclear carbon, as in the above-listed examples, but to an aliphatic carbon. Thus, allylbenzenesulfonic acids, methallylbenzenesulfonic acids, and haloallylbenzenesulfonic acids as, for example, 2-allylbenzenesulfonic acid

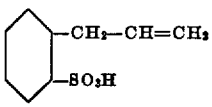

3-beta-methallylbenzenesulfonic acid

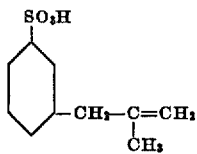

4-beta-bromallylbenzenesulfonic acid

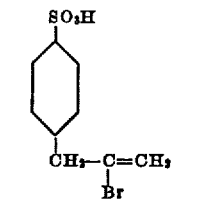

may be used.

Aromatic sulfonic acids in which the sulfonic acid group is attached not to a nuclear carbon but to an aliphatic carbon atom are also suitable for use according to the present invention. Thus, acids having the general formula

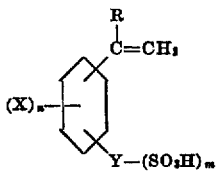

in which X may be a halogen atom, a hydroxyl group, or an alkyl group having 1 to 8 carbon atoms, R is hydrogen or methyl or a halogen atom, Y is a divalent aliphatic, saturated or unsaturated, hydrocarbon radical having from 1 to 4 carbon atoms, m is 1 or 2, and n is zero or a whole number from 1 to 3. Some examples of such acids are:

o-, m-, or p-vinylphenylmethanesulfonic acids

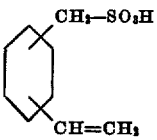

o-, m-, or p-vinylphenylethanesulfonic acids

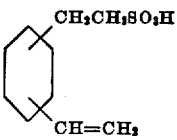

o-, m-, or p-isopropenylphenyl-n-butanesulfonic acids

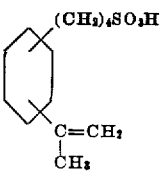

o-, m-, or p-alpha-chlorovinylphenyl-n-propanesulfonic acids

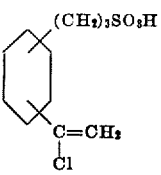

2-vinyl-3-chlorophenylmethanesulfonic acid

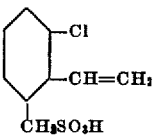

2-vinyl-4-chlorophenylethanesulfonic acid

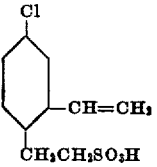

2-vinyl-5-bromophenyl-n-butanesulfonic acid

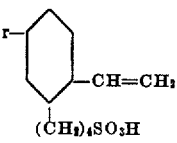

2-vinyl-3-methylphenylmethanesulfonic acid

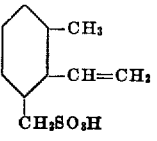

2-vinyl-4-ethylphenyl-n-propanesulfonic acid

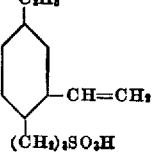

2-isopropenyl-5-n-octylphenylethanesulfonic acid

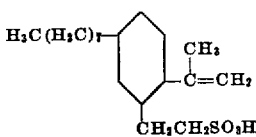

3-methyl-4-alpha-chlorovinylphenylmethanesulfonic acid

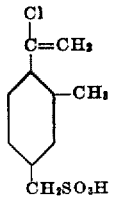

3-vinyl-4-hydroxyphenylmethanesulfonic acid

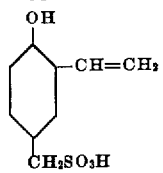

2-vinyl-3,4,5-trihydroxyphenylethanesulfonic acid

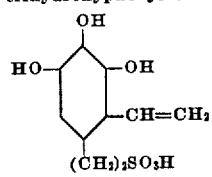

2-isopropenyl-4-hydroxy-5-chlorophenylmethanesulfonic acid

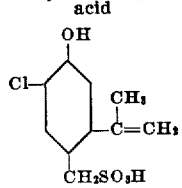

2-vinyl-4-ethyl-6-chlorophenyl-n-propanesulfonic acid

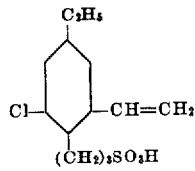

1-[2-vinylphenyl]-n-butanedisulfonic acid-2,4

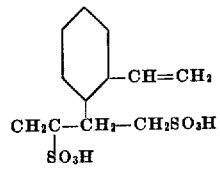

1-[4-vinylphenyl]-ethanesulfonic acid-1

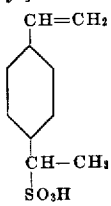

4-[3-vinylphenyl]-2-butenesulfonic acid-2

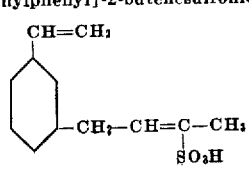

Sulfonic acids containing sulfonic acid groups attached both to nuclear and aliphatic carbon atoms may also be used as, for example, 1-sulfo-3-vinylphenylmethanesulfonic acid.

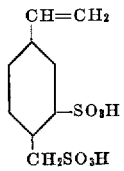

I prefer using the aromatic sulfonic acids in the form of their alkali metal salts for copolymerization. The alkali metal sulfonate groups in the resinous copolymer product may be readily hydrolyzed to the free acid by treatment with acid as in the usual process for regeneration of exhausted cation exchange resins.

Heterocyclic sulfonic acids containing the necessary $CH_2=C<$ group are also operative in the preparation of my new resins. A few examples of such acids are:

2-sulfo-5-allylfurane

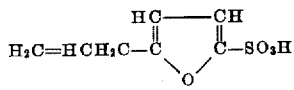

2-sulfo-4-vinylfurane

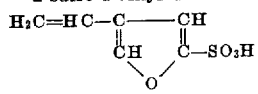

2-sulfo-5-vinylthiophene

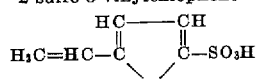

Aliphatic sulfonic acids suitable for use in the present invention include those represented by the general formula

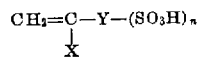

in which X may be hydrogen or a group such as halogen, carboxyl, sulfo, cyano, carbamyl, nitro, aryl, i. e., phenyl, tolyl, xylyl, biphenylyl, naphthyl, etc., saturated or unsaturated aliphatic hydrocarbon radicals having from 1 to 5 carbon atoms, i. e., methyl, ethyl, isopropyl, n-butyl, isobutyl, tert.butyl, n-amyl, isoamyl, tert.amyl, alyl, 2-butenyl(crotyl)

3-butenyl($CH_2=CH-CH_2-CH_2-$)
2-pentenyl($CH_3CH_2CH=CH-CH_2-$)
3-pentenyl($CH_3CH=CHCH_2CH_2-$)
4-pentenyl($CH_2=CH-(CH_2)_3-$)

etc. and the radicals —COOR, —COR, —CONR$_2$, —OR, and RCOO— in which R may be any organic hydrocarbon group—aliphatic or aromatic, saturated or unsaturated—but is preferably an alkyl group of from 1 to 5 carbon atoms. Y is a divalent aliphatic saturated or unsaturated hydrocarbon radical of from 1 to 4 carbon atoms, and $n$ is 1 or 2. Thus, I may use, in addition to ethylenesulfonic acid itself, 1-bromoethylenesulfonic acid

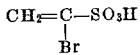

1-cyanoethylenesulfonic acid

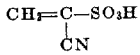

1-carbamylethylenesulfonic acid
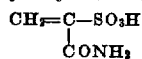

1-nitroethylenesulfonic acid
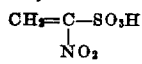

1-phenylethylenesulfonic acid
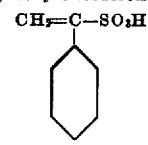

1-isopropylethylenesulfonic acid
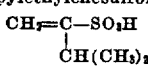

1-allylethylenesulfonic acid
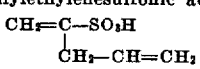

1-carbethoxyethylenesulfonic acid
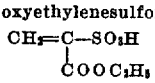

1-carbophenoxyethylenesulfonic acid
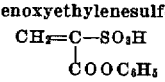

1-carbocrotyloxyethylenesulfonic acid
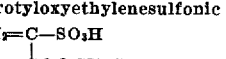

1-acetylethylenesulfonic acid
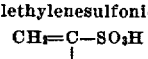

1-naphthoylethylenesulfonic acid
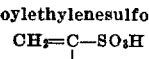

1-crotonylethylenesulfonic acid
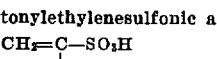

1-amoxyethylenesulfonic acid
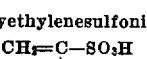

1-biphenylyloxyethylenesulfonic acid
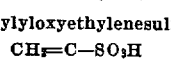

1-allyloxyethylenesulfonic acid
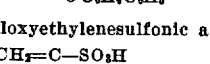

1-acetoxyethylenesulfonic acid
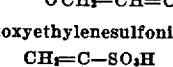

1-benzoxyethylenesulfonic acid
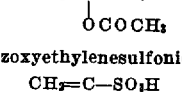

1-acrylyloxyethylenesulfonic acid
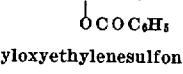

2-propenesulfonic acid
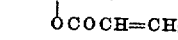

3-butenesulfonic acid
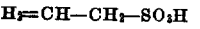

5-hexenesulfonic acid
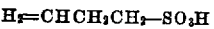

2,5-hexadienesulfonic acid
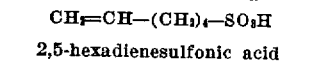

2-sulfopropene-1
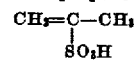

3-sulfobutene-1
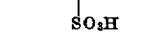

2-methyl-4-pentenesulfonic acid
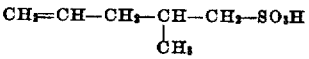

3-chloro-3-butenesulfonic acid

2-ethyl-3-butenesulfonic acid
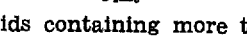

Sulfonic acids containing more than a single acid radical, sulfonic or otherwise, may also be used in the preparation of my new copolymer-type cation exchange resins, i. e.,

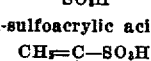
1-sulfoacrylic acid

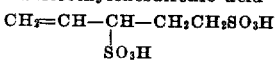
1-sulfoethylenesulfonic acid 3-sulfo-4-pentenesulfonic acid
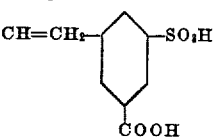

3-vinyl-5-sulfobenzoic acid
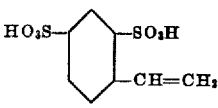

2-vinyl-1,5-benzenedisulfonic acid
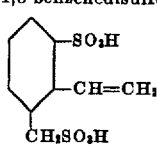

2-vinyl-3-sulfophenylmethanesulfonic acid
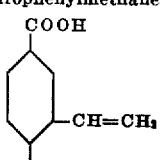

3-vinyl-4-sulfomethylbenzoic acid

Sulfonic acids containing more than one CH₂=C< group may also be copolymerized with polyunsaturated materials according to the process of the present invention.

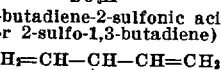
1,3-butadiene-2-sulfonic acid
(or 2-sulfo-1,3-butadiene)

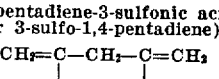
1,4-pentadiene-3-sulfonic acid
(or 3-sulfo-1,4-pentadiene)

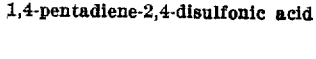
1,4-pentadiene-2,4-disulfonic acid

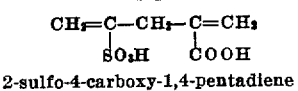
2-sulfo-4-carboxy-1,4-pentadiene

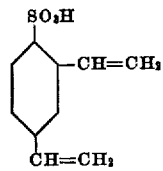
2,4-divinylbenzenesulfonic acid

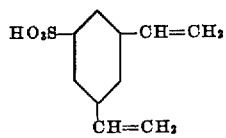
3,5-divinylbenzenesulfonic acid

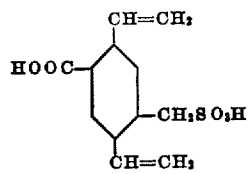
2,5-divinyl-4-carboxyphenylmethanesulfonic acid are therefore suitable.

Instead of the sulfonic acids of the type disclosed as suitable for use in the present invention, derivatives thereof which are hydrolyzable to the acids may be copolymerized with a polyunsaturated material, and the copolymer then hydrolyzed in order to provide free sulfonic acid groups for the cation exchange resin. Alkali metal salts of the sulfonic acids may be used; it has already been pointed out that aromatic sulfonic acids are preferably used in the form of their alkali metal salts. Similarly operative are the sulfonic acid chlorides, anhydrides, amides, and alkyl, aryl, and aralkyl esters. Taking ethylenesulfonic acid as a typical example of a sulfonic acid adapted for use in the present invention, I may therefore substitute for it ethylenesulfonyl chloride, $CH_2=CH-SO_2Cl$; ethylenesulfonic anhydride, $(CH_2=CH-SO_2)_2O$; ethylenesulfonamide, $CH_2=CHSO_2NH_2$; sodium or potassium ethylenesulfonate; alkyl esters of ethylenesulfonic acid such as methyl ethylenesulfonate, ethyl ethylenesulfonate, isobutyl ethylenesulfonate, amyl ethylenesulfonate, etc.; aryl esters of ethylenesulfonic acid such as phenyl ethylenesulfonate, naphthyl ethylenesulfonate, etc.; aralkyl esters of ethylenesulfonic acid such as benzyl ethylenesulfonate; substituted ethylenesulfonamides of the formula

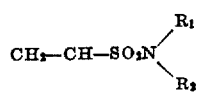

in which $R_1$ may be hydrogen, alkyl, aryl, or aralkyl, and $R_2$ may be alkyl, aryl, or aralkyl, examples of such amides being N-methylethylenesulfonamide, N,N-diethylethylenesulfonamide, N-methyl-N-ethylethylenesulfonamide, N-phenylethylenesulfonamide, N,N-diphenylethylenesulfonamide, N-methyl-N-phenylethylenesulfonamide, N-benzylethylenesulfonamide, N-ethyl-N-benzylethylenesulfonamide, and the like. Similar derivatives of other organic sulfonic acids than the ethylenesulfonic acid may also be used. Moreover, it is obvious that mixtures of any number of sulfonic acids or hydrolyzable derivatives thereof may be copolymerized with a polyunsaturated material in accordance with the present invention.

If a hydrolyzable derivative of a suitable sulfonic acid is used in the preparation of my new resins, the resinous product obtained may be readily hydrolyzed to the free acid. In general, this is done in the case of the acid chlorides and anhydrides by boiling with water; in the case of the esters, by boiling with alkali; and in the case of the amides, by boiling with acid.

The present invention is in no sense limited to the use of N,N'-methylenediacrylamide as one of principal resin-forming ingredients, and any of the diacrylamides disposed in the copending Lundberg application referred to above may be substituted therefor. These diacrylamides may be represented by the following general formula:

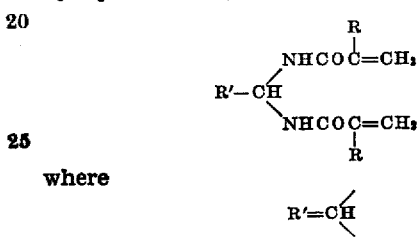

where $R'=C\overset{H}{\underset{\diagdown}{\diagup}}$ is that portion of a saturated or unsaturated aliphatic aldehyde, an aromatic aldehyde or a heterocyclic aldehyde which is attached to the carboxylic oxygen, and R is either hydrogen or a hydrocarbon radical, i. e., alkyl, aryl, or aralkyl. Specifically may be mentioned:

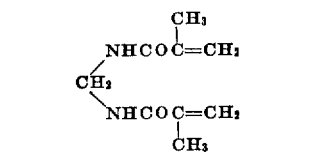
N,N'-methylenedimethacrylamide

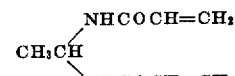
N,N'-ethylidenediacrylamide

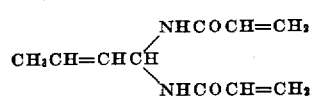
N,N'-crotylidenediacrylamide

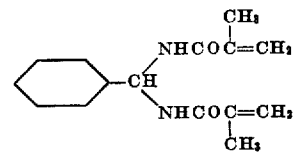
N,N'-benzylidenedimethacrylamide

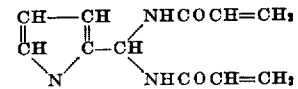
N,N'-furfurylidenediacrylamide

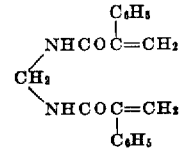
N,N'-methylenediphenacrylamide

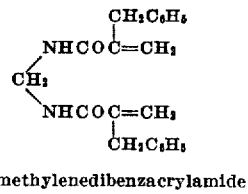

N,N'-methylenedibenzacrylamide and the like.

Similar compounds of the formula

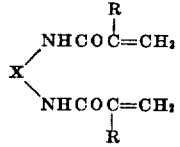

wherein X is an alkylene or arylene radical and R is hydrogen or an alkyl, aryl or aralkyl radical may be used, as may be corresponding sulfonamide derivatives of the formula

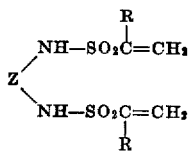

in which Z is alkylene or arylene or that portion of a saturated or unsaturated aliphatic aldehyde, an aromatic aldehyde or a heterocyclic aldehyde which is attached to the carboxylic oxygen, and R is either hydrogen or a hydrocarbon radical as in the foregoing formulae. Thus, specifically, I may use:

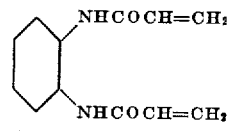

1,2-diacrylamidobenzene

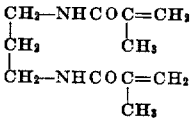

1,3-dimethacrylamidopropane

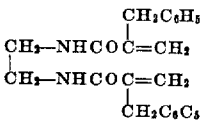

1,2-dibenzacrylamidoethane

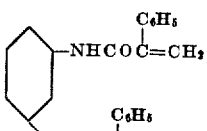

1,3-diphenacrylamidobenzene

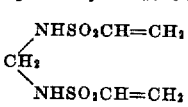

diethylenesulfonamidomethane

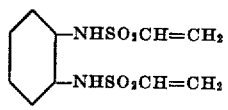

1,2-diethylenesulfonamidobenzene

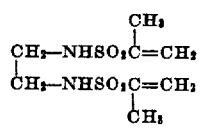

1,2-di(alpha-methylethylenesulfonamido)-ethylene

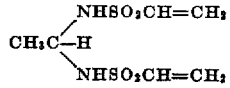

N,N'-ethylidenediethylenesulfonamide

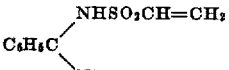

N,N'-benzylidenediethylenesulfonamide

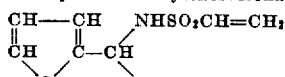

N,N'-furfurylidenediethylenesulfonamide and the like.

Moreover, any polymerizable material containing more than one ethylenic-type double bond but no conjugated aliphatic carbon-to-carbon double bonds may be substituted for the diacrylamides and disulfonamides described above. I prefer those materials which contain a plurality of $CH_2=C<$ groups as the ethylenic linkages, but the invention is not so limited. Examples of suitable polyunsaturated materials include divinyl ether, divinyl sulfone, allyl ethers of polyhydric compounds such as glycerol, pentaerythritol, resorcinol, etc., divinylbenzene, divinylketone, divinylsulfide, polydienes, such as polybutadiene, polychloroprene, polyisoprene, etc., polyfumaramide, allyl acrylate, and the like. Polyesters of allyl alcohol, 2-methallyl alcohol, 2-chloroallyl alcohol, etc., with polybasic acids, both organic and inorganic, may also be copolymerized with unsaturated sulfonic acids according to the present invention. For example, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitate, triallyl citrate, triallyl phosphate, and the corresponding substituted allyl alcohol esters, are suitable.

It is essential that the material to be copolymerized with an unsaturated sulfonic acid according to the process of the present invention be polyunsaturated, i. e., contain a plurality of ethylenic double bonds, preferably $CH_2=C<$ groups, and have no conjugated aliphatic carbon-to-carbon double bonds. Thus, while the material must have at least two ethylenic double bonds, it may have three, four, six, eighteen, one hundred, or an infinite number of such linkages.

Similar resins to those of the present invention may be obtained by polymerization of a single compound which combines the essential characteristics of the two principal components of the copolymers described above. For example, polymerization of polybutadiene sulfonic acids, alkali metal salts of divinylbenzene sulfonic acids, allyl ethers of sulfonated phenolic compounds and the like produces resins which may be used in ion exchange processes.

The copolymerization reaction which results in the production of the new cation exchange resins of the present invention is preferably carried out in the presence of a polymerization catalyst. Suitable catalysts include hydrogen peroxide; the acidic peroxides as, for example, benzoyl peroxide, phthalic peroxide, succinic peroxide, and benzoyl acetic peroxide; fatty acid peroxides as, for example, cocoanut oil acid peroxides, lauric peroxide, stearic peroxide, and oleic peroxide; alcohol peroxides as, for example, tert. butyl hydroperoxide, ditert. butyl peroxide; terpene oxides as, for example, ascaridole; and the like. Other polymerization catalysts which may be used include alkali metal persulfates, azo compounds as, for example, alpha,alpha'-azoisobutyronitrile ("Porophor N"), soluble cobalt salts, i. e., cobalt linoleate and cobalt naphthenate, p-toluene sulfonic acid, p-toluene sulfonamide, aluminum chloride, stannic chloride, boron trifluoride, etc. The term "polymerization catalyst" as used is not intended to cover oxygen contained in the resin as an impurity.

The concentration of catalyst employed is usually small and generally ranges from about 1 part catalyst per 1000 parts of copolymerizable mixture to about 2 parts catalyst per 100 parts of the copolymerizable mixture. If an inhibitor be present, however, up to 5% or more of the catalyst may be necessary.

Choice of a catalyst in any particular case depends upon the desired result. For example, the peroxide catalysts are generally preferred and they accelerate copolymerization across the double bonds of the copolymerizable materials. If, however, one or both of the copolymerizable materials is an aromatic compound and an acid catalyst such as, for example, aluminum chloride, boron trifluoride or the like is selected, some or all of the copolymerization may take place by alkylation of the aromatic nucleus. This alkylation-type polymerization is generally to be avoided, if possible, in the present invention, but if it does take place to some extent it need not adversely affect the utility of my new products for ion exchange operations.

It is sometimes advisable to incorporate in the copolymerizable mixture of the present invention a small proportion of a polymerization inhibitor in order to avoid polymerization thereof on storage. When polymerization is desired, enough catalyst is added to overcome the effect of the inhibitor and to promote the reaction.

Suitable polymerization inhibitors for this reaction include phenolic compounds, especially the polyhydric phenols, aromatic amines, aldehydes, sulfur compounds, and the like. Examples of some inhibitors are hydroquinone, benzaldehyde, ascorbic acid, isoascorbic acid, resorcinol, tert. butyl catechol, tannin, sym. di-beta-naphthyl-p-phenylenediamine, phenolic resins, etc.

The concentration of inhibitor is preferably low, and I have found that less than about 1% is usually sufficient. With the preferred inhibitors, I need use only about 0.01% to about 0.1%.

Some substances which normally exhibit an inhibiting effect on polymerization may, under certain circumstances, promote polymerization. Since an oxidation-reduction system is apparently involved in such cases of polymerization and the peroxide type of catalyst is generally preferred for the preparation of my cation active resins, I find the Redox peroxide-bisulfite system particularly useful.

Polymerization may be effected by means of heat, light, or a combination of the two. Ultraviolet light is more effective in this respect than ordinary light. In general, polymerization temperatures will range from about 20° to 25° C. up to the boiling point of the lower boiling of the two copolymerizable ingredients.

The unsaturated organic sulfonic acids and polyunsaturated materials are generally combined in molar ratios of from about 1:1 to about 20:1, unsaturated sulfonic acid to polyunsaturated compound, although the invention is in no sense limited to these particular proportions.

The copolymerization reaction resulting in the production of my new cation exchange resins may be carried out in aqueous solution or in solution in a suitable polar organic solvent such as, for example, dioxane; aliphatic monohydric alcohols including methanol, propanol, etc.; glycols, i. e., ethylene glycol, diethylene glycol, 2-methyl-2,4-pentanediol, propylene glycol, etc.; aliphatic ketones including dimethyl ketone, methyl ethyl ketone, etc. Generally speaking, any polar organic solvent which is stable in the presence of acid is suitable.

Copolymerization of the organic sulfonic acid and polyunsaturated material may also be carried out, if desired, in emulsion or dispersion in an aqueous or non-aqueous medium. In this case, cationic, anionic, or non-ionic surface active agents may be added.

The resins prepared according to the present invention may be cured at from about room temperature (20°–25° C.) to about 150° C. I prefer heating at elevated temperatures, i. e., from 90°–150° C.

It is an advantage of the present invention that the granular water-insoluble synthetic resins produced in accordance therewith are capable of exchanging cations in liquid media and of removing cations from liquid media. In this connection, my resinous materials may be used in admixture with other cation active materials or with inert materials, or they may be used alone. For example, my resins may be applied before gelation to a suitable carrier such as diatomaceous earth, clay, charcoal, etc.

Resinous materials prepared according to my invention are useful in the removal of cations from fluid media, especially from aqueous solutions. The resins may be used in the hydrogen-activated form to remove cations from solutions of bases and salts, and they may also be employed as exchange materials in accordance with the principles applied to the use of the natural and synthetic zeolites. Thus, the resin may be activated with a sodium salt such as sodium chloride, and upon contact with a solution containing calcium, magnesium, or other cations, an exchange of the latter ions for the sodium ions takes place.

The activating solutions or regenerating solutions for my resins are dilute acid solutions or dilute salt solutions, e. g., about 0.2%–20% of sulfuric acid, hydrochloric acid, sodium chloride, potassium chloride, etc.

To be sufficiently insoluble for practical use in the art of water purification, a resin should have a sufficiently low solubility that it will not be dissolved away rapidly by the solution to be treated. Thus, water should not dissolve more than 1 part of resin in 1000 parts of water and preferably should not dissolve more than 1 part of resin in 100,000 parts of water when passed through a bed of resin (after the first cycle comprising an activation, exhaustion, and reactivation of the resin).

It is preferable to grind and screen the resins to a particle size of from about 8–60 mesh. Use of larger particles causes channeling, and smaller particles of resin have been found to pack, thus reducing the cation exchange efficiency of the material.

My resinous materials are useful for a wide variety of purposes. Some of the uses which may be mentioned by way of example are: water purification; purification of glycerol, glycols, etc.; purification of aqueous solutions containing sugar, including sugar cane juice, sugar beet juice, sugar syrups, etc.; purification of water from lead pipes; removal of heavy metal ions from food, beverages, and pharmaceutical products; decolorization of solutions containing coloring matters, etc. My resins may also be employed to recover valuable metal cations from dilute solutions, e. g., gold from sea water, chromium from chrome tanning liquors, silver from photographic baths, etc. Another important application of my materials is in the absorption or adsorption of gases such as ammonia, the amines, e. g., triethyl amine, methyl amine, etc., from fluid media, either dissolved in a liquid or from vapors. The resins may also be employed as catalysts for many of those reactions normally involving the use of acidic catalysts such as the inversion of sucrose, the conversion of starches to sugars, etc.

I claim:

1. A granular, water-insoluble cation exchange resin active for the removal of cations from solution which is a copolymer of (1) ethylenesulfonic acid and (2) N,N'-methylenediacrylamide, the molar ratio of (1) to (2) being from about 1:1 to about 20:1.

2. The process which comprises passing an aqueous solution containing cations through a bed of the resin of claim 1.

3. A process for preparing a granular water-insoluble cation exchange resin active for the removal of cations from solution which comprises heating a mixture including (1) ethylene sulfonic acid and (2) N,N'-methylene diacrylamide in a molar ratio of from about 1:1 to about 20:1 in the presence of a polymerization catalyst, curing the resulting gel by heating, and granulating the cured gel.

JAMES R. DUDLEY.

REFERENCES CITED

The following references are of record in the file of this patent:

UNITED STATES PATENTS

| Number | Name | Date |
|---|---|---|
| 2,348,705 | Alderman | May 16, 1944 |
| 2,366,007 | D'Alelio | Dec. 26, 1944 |
| 2,427,640 | Whitehill | Sept. 16, 1947 |
| 2,469,472 | Nachod | May 10, 1949 |
| 2,475,846 | Lundberg | July 12, 1949 |

FOREIGN PATENTS

| Number | Country | Date |
|---|---|---|
| 67,658 | Norway | Apr. 3, 1944 |